United States Patent [19]
Tolman

[11] Patent Number: 5,546,256
[45] Date of Patent: Aug. 13, 1996

[54] INDUCTIVE TRANSDUCER WITH CLOSED-LOOP POLE CIRCUMSCRIBING I-SHAPED POLE TO REDUCE LEAKAGE FLUX

[75] Inventor: Charles H. Tolman, Bloomington, Minn.

[73] Assignee: Seagate Technology, Inc., Scotts Valley, Calif.

[21] Appl. No.: 327,182

[22] Filed: Oct. 21, 1994

[51] Int. Cl.⁶ .................................................. G11B 5/197
[52] U.S. Cl. ............................................................. 360/126
[58] Field of Search ................................... 360/126, 125; 29/603

[56] References Cited

U.S. PATENT DOCUMENTS

| | | | |
|---|---|---|---|
| 4,150,408 | 4/1979 | Koel et al. | 360/113 |
| 4,300,177 | 11/1981 | Koel et al. | 360/113 |
| 4,374,403 | 2/1983 | Oshima et al. | 360/113 |
| 4,566,050 | 1/1986 | Beam et al. | 360/113 |
| 4,782,415 | 11/1988 | Vinal | 360/113 |
| 4,816,947 | 3/1989 | Vinal et al. | 360/113 |
| 5,095,397 | 3/1992 | Nagata et al. | 360/113 |
| 5,164,869 | 11/1992 | Fontana, Jr. et al. | 360/113 |
| 5,195,005 | 3/1993 | Mallary | 360/126 |
| 5,452,168 | 9/1995 | Nepela | 360/126 |

*Primary Examiner*—A. J. Heinz
*Attorney, Agent, or Firm*—Kinney & Lange, P.A.

[57] ABSTRACT

A magnetic pole assembly for a transducer includes a first pole piece having first and second arms joined to form front and back regions. The first and second arms are spaced between the front and back regions to form a region of low leakage-flux density. A second pole piece having front and back regions lies partly in the region of low leakage-flux density between the first and second arms of the first pole. The back region of the second pole is joined to the back region of the first pole, and the front regions of the first and second poles confront to form a gap. In one embodiment, the first and second poles are each formed of first and second portions with the first portion of the first pole and the second portion of the second pole formed in a first thin-film layer and the second portion of the first pole and the first portion of the second pole formed in a second thin-film layer spaced apart and substantially parallel to the first layer. Vias join the first and second portions of the poles together as well as the back portions of the poles. An inductive coil has a plurality of convolutions lying between the two layers, each convolution passing between the poles twice.

19 Claims, 5 Drawing Sheets

INDUCTIVE TRANSDUCER WITH CLOSED-LOOP POLE CIRCUMSCRIBING I-SHAPED POLE TO REDUCE LEAKAGE FLUX

BACKGROUND OF THE INVENTION

This invention relates to thin-film magnetic transducers of the type used to write data to and/or read data from magnetic discs.

Thin-film magnetic transducers are used widely within the computer industry for writing data to, and reading data from, magnetic media. In a typical data storage and retrieval system, a controller and actuator place the transducer adjacent a moving magnetic medium such as a rotating disc. The transducer writes data to the medium by imparting a magnetic field to the medium and reads data from the media by sensing the magnetic field from the medium as it passes the transducer.

Thin-film magnetic transducers typically comprise two opposing magnetically-permeable layers or films, called pole pieces, a transducing gap, and an inductive coil. The pole pieces, usually a top and a bottom pole piece, are spaced apart to form the transducing gap and are connected at a junction distal from the transducing gap. The inductive coil is an insulated conductor wound around one or both of the poles to achieve a magnetic linkage.

To write a data pattern, an electric current is supplied to the inductive coil to induce a magnetic flux to circulate from one pole, across the gap, into the other pole. The flux crossing the gap impresses a magnetic field onto a surface of a magnetic disc rotating adjacent the gap. The magnetic field coerces magnetic domains on the disc into alignment with the magnetic field, leaving a recoverable magnetic data pattern. Reading such a pattern entails moving the gap adjacent the pattern on the rotating disc. The magnetic pattern imposes a changing magnetic field on the gap and the top and bottom poles, creating a changing flux in the poles. This flux in turn induces an electric signal in the inductive coil. Electric circuitry connected to the coil ultimately translates the signal into a retrieved data pattern.

Thin-film magnetic transducers are often fabricated by a photolithographic process. The process entails depositing successive layers of conductive, magnetic, and insulating material onto a substrate using photoresists, photomasks, and chemical etchants to define specific patterns for the magnetic poles, inductive coil, insulated gap, and other portions of the transducer.

One problem inherent to thin-film magnetic transducers is flux shunting. Flux shunting refers to the behavior of magnetic flux in a two-pole magnetic circuit where flux traveling in one pole jumps to the other pole before traveling the complete circuit. Generally, a two-pole magnetic circuit consists of a from gap, and two parallel poles joined at a distal back-gap junction. The two poles, composed of magnetic material, are typically stacked, one atop the other, in close proximity, with a layer of insulating material between them. Ideally, flux would circulate through the magnetic circuit along one pole, across the distal back-gap junction, and along the second pole back to the front gap. In practice, however, some flux shunts, or leaks, directly through the insulating layer from one pole to the other rather than following the defined magnetic circuit. This shunted, or leakage, flux contributes only partially to the magnetic coupling between the poles and the inductive coil. Flux shunting, therefore, diminishes transducer efficiency by reducing both voltage sensed during reading and flux induced during writing.

Analytically, flux shunting may be likened to a partial short circuiting in electric circuits where the amount of short circuiting depends on the resistance between the conductors. Similarly, flux shunting depends on the magnetic resistance, or reluctance, of the insulating material between two magnetic conductors or pole pieces. The amount or degree of flux shunting is inversely proportional to the reluctance of the insulating material. In general, reluctance varies directly with the length and permeability of the insulating material and inversely with its cross-sectional area. Thus, the amount of flux shunting between two poles of a transducer is fixed by the dimensions and composition of an interior insulated region bounded by the two poles, the transducing gap, and the distal back-gap junction. Accordingly, the problem of flux shunting has been addressed by introducing a bow into one or both poles to increase the thickness of the insulating layer and the distance between the poles. Introducing the bow requires building a "hill" of insulation layers ascending away from the front gap and descending toward the back-gap junction. Insulating layers forming the hill, however, are usually applied by a spin process, which is difficult to control at the increased heights needed for the bow. Thus, fabricating the bow increases the complexity and cost of manufacturing the poles. Moreover, the tendency of magnetic flux to fringe near discontinuities, such as a bow, limits the degree to which the pole may be bowed without compromising the effectiveness (flux channeling efficiency) of the magnetic circuit.

Another problem of prior magnetic pole structures concerns the inductive coil. Typically, the coil is wound into a flat spiral around the back-gap junction of the poles, dividing the coil into front and rear halves. The front half, therefore, lies sandwiched between the poles, and the rear half lies behind the back-gap junction. Only the sandwiched, front half of the coil magnetically links to the poles. The "unsandwiched" rear merely completes the electric circuit of the coil. In other words, it adds nothing to the magnetic coupling between the coil and the poles. In fact, the electrical resistance of the unsandwiched portion detracts from the overall efficiency and performance of the magnetic transducer.

SUMMARY OF THE INVENTION

A magnetic pole assembly for a transducer includes a first pole piece having first and second arms having front and back ends. The arms are joined at their respective front and back ends to form front and back regions. The front region defines a first surface, and the arms are spaced apart to form a region of low leakage-flux density. A second pole piece having front and back regions lies partly in the region of low leakage-flux density between the first and second arms of the first pole piece. The back regions of the first and second pole pieces are joined, and the front regions of the first and second poles confront to form a gap.

In one form of the invention, the back region of the second pole and the front region of the first pole comprise a first thin-film layer, and the back region of the first pole and the front region of the second pole comprise a second thin-film layer spaced apart from the first. Vias join the back regions of the poles to their respective front regions. A coiled conductor is formed in a third layer between the first and second layers. The coiled conductor comprises a plurality of convolutions, each passing over the front and under the rear portion of the first pole piece and under the front and over the rear portion of the second pole piece. Thus, the coiled conductor links twice with each pole piece.

In another form of the invention, the back regions of the first and second poles comprise the same thin-film layers as the respective front regions. A coiled conductor is formed in a third thin-film layer between the first and second layers.

According to another aspect of the invention, a method of making a magnetic transducer is provided. A first layer of magnetic material is formed on a substrate to form a front portion of a first pole having first and second arms, each with a front end. The front ends are joined to form a front region defining a first surface. The first and second arms are spaced apart to form a region of low leakage-flux density between them. A first layer of insulating material is formed over the first layer of magnetic material. A layer of conductive material is formed atop the first insulating layer to form a conductor portion of an inductive coil and covered by a second layer of insulating material. A second layer of magnetic material is formed atop the second insulating layer to form a front portion of a second pole having a front end defining a second surface. The second surface confronts the first surface to form a gap region. The front portion of the second pole piece lies between the first and second arms of the front portion of the first pole in the region of low leakage-flux density.

In one form of the invention, a back portion of the second pole is formed in the first layer, and a back portion of the first pole is formed in the third layer. Vias in the first and second insulating layers join the back regions of the respective poles to their respective front regions. The convolutions of the coil conductor are arranged so that a first portion of each convolution passes between the front portions of the two pole pieces and a second portion of each convolution passes between the back portions of the two pole pieces. Thus, each convolution links twice with the two pole pieces.

In another form of the invention, the back regions of the first and second poles are formed in the respective first and third layers of magnetic material. Each convolution of the inductive coil links only once with the two pole pieces.

DETAILED DESCRIPTION OF THE PREFERRED EMBODIMENTS

Figure 1:
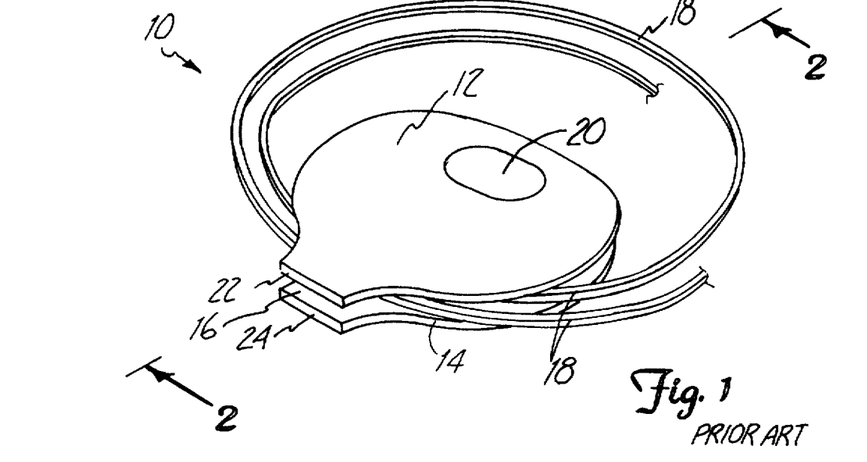
FIG. 1 is a perspective view of a prior art thin-film magnetic transducer.
Figure 2:
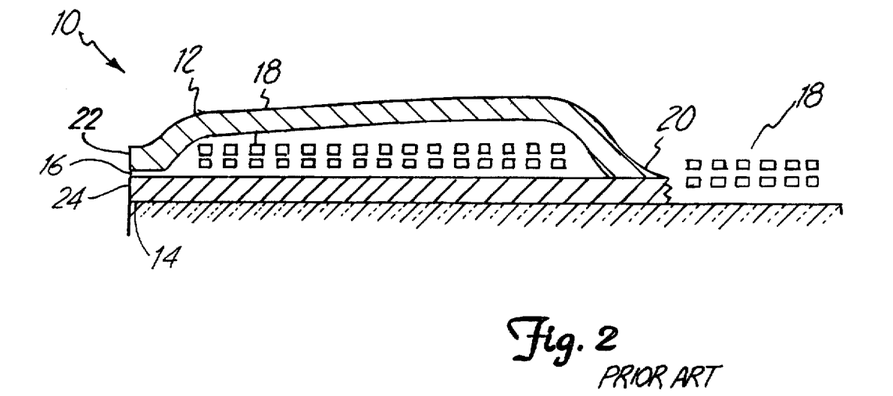
FIG. 2 is section view taken along line 2—2 of FIG. 1.

FIGS. 1 and 2 are respective top and section views of a prior art thin-film magnetic transducer 10 having a top-pole piece 12 and a bottom-pole piece 14 separated by a transducing gap 16 which lies between pole tips 22 and 24. Poles 12 and 14 are joined by via 20, a junction distal from gap 16. An inductive coil 18 is wound around via 20 and partly sandwiched between the poles in the region between gap 16 and via 20. Coil 18 is insulated from poles 12 and 14 by cured photoresist or other suitable insulator (not shown). Typically, poles 12, 14, and via 20 are formed from a magnetic alloy, such as permalloy.

Using transducer 10 as a writer entails forcing current flow in coil 18. Current flow in coil 18 induces a magnetic flux to flow through the magnetic circuit along pole 12, across gap 16, along pole 14 and back through via 20. Flux crossing gap 16 generates a magnetic field which is impressed upon a magnetic disc rotating adjacent gap 16. The magnetic field, oriented according to the directions of current and flux flow, dictates the orientation of magnetic domains in the magnetic disc. When used as a reader, transducer 10 responds to varying magnetic fields from the rotating magnetic disc. These fields induce a flux in the magnetic circuit formed by poles 12 and 14, via 20, and gap 16. This flux, in turn, generates a voltage in coil 18, corresponding to the orientation of the magnetic domains on the disc. This voltage is detected by suitable detection circuitry, not shown.

Figure 3:
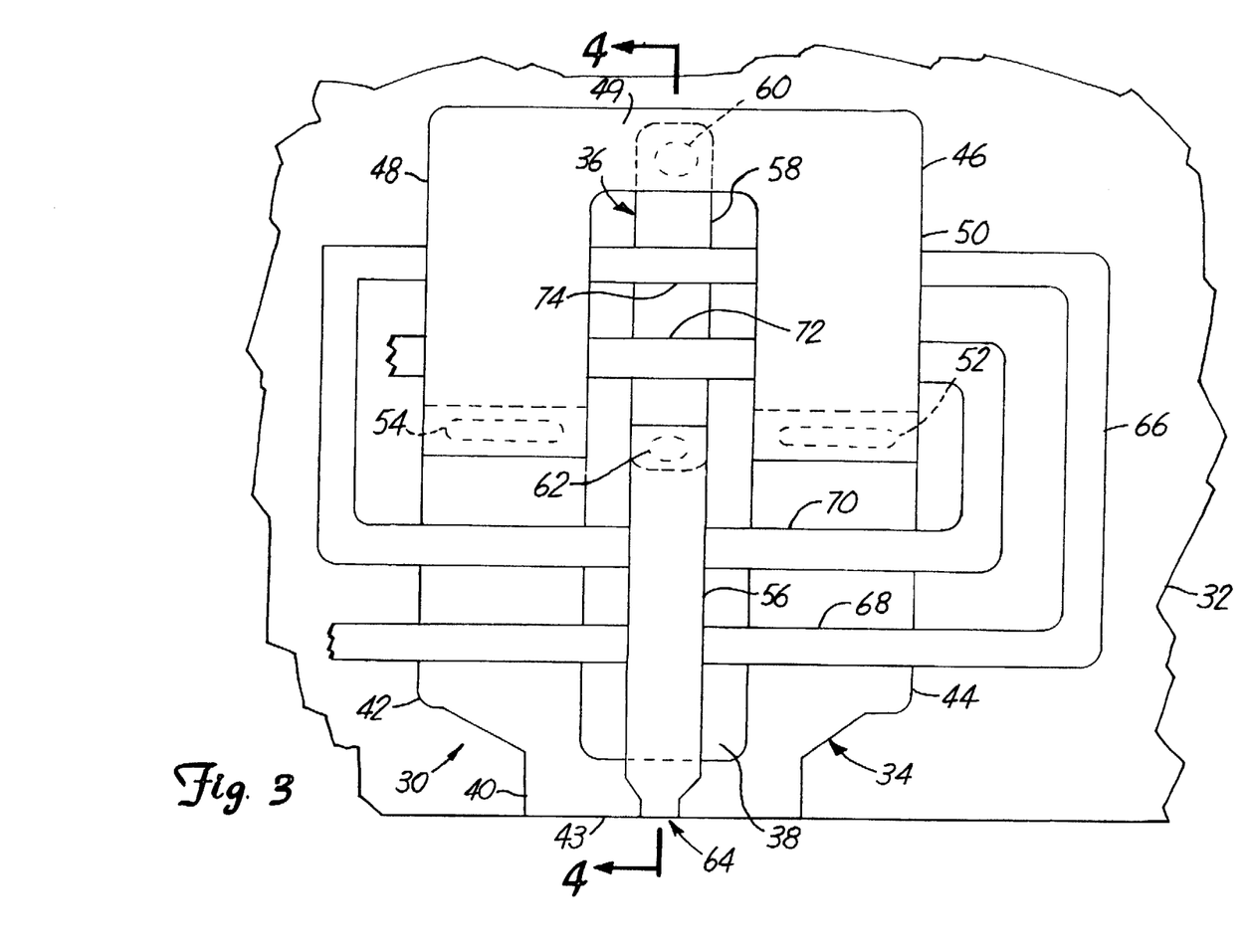
FIG. 3 is a top view of a transducer, with portions removed for clarity, according to the presently preferred embodiment of the present invention.
Figure 4:
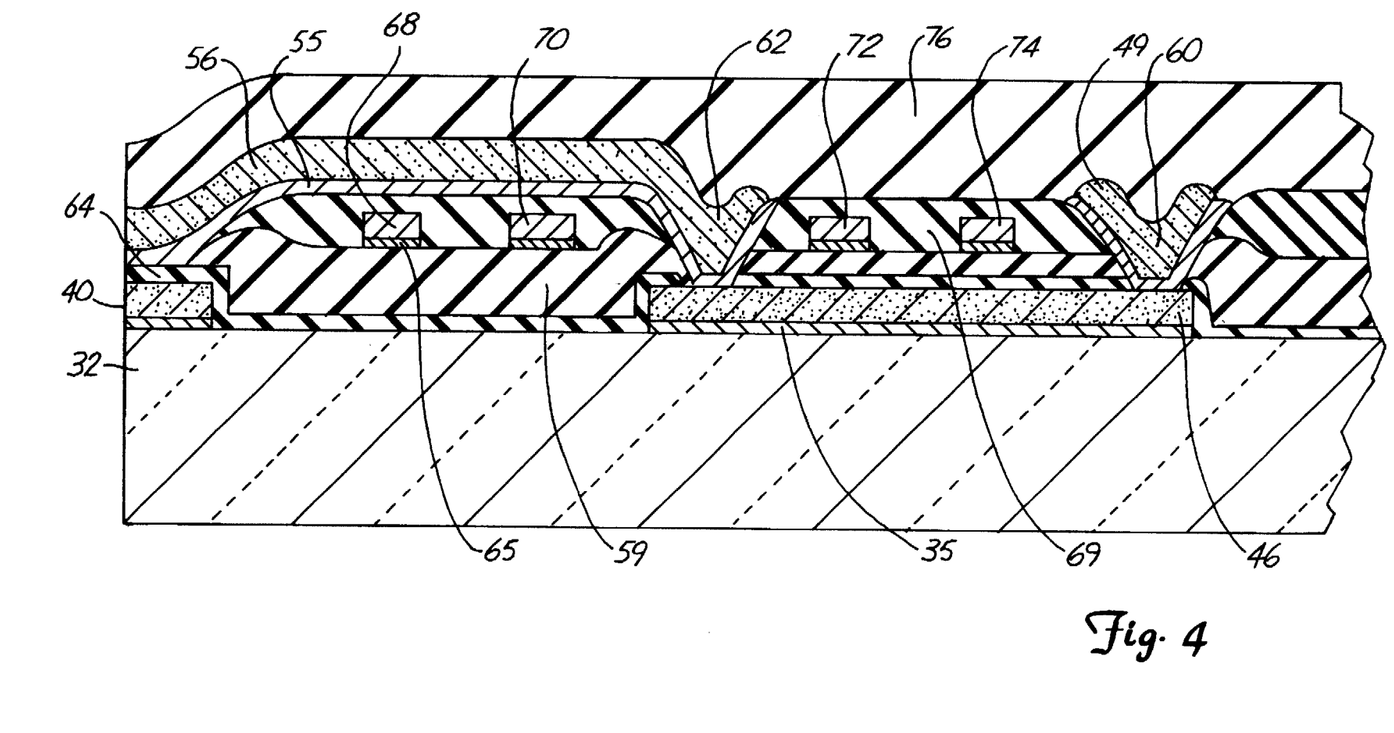
FIG. 4 is a section view taken along line 4—4 in FIG. 3.
Figure 5:
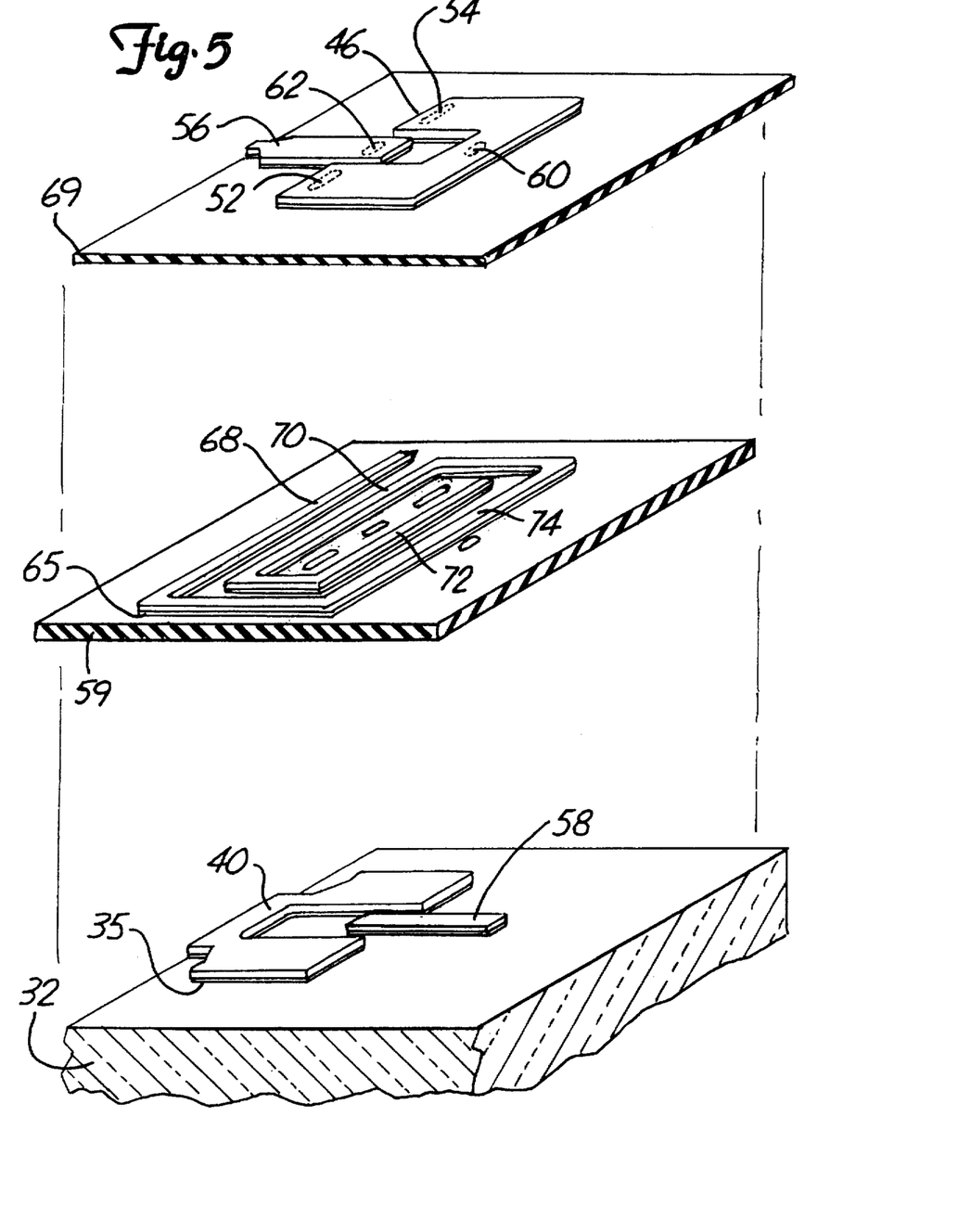
FIG. 5 is an exploded perspective illustrating the preferred method of constructing the transducer of FIG. 3.

FIGS. 3, 4, and 5 illustrate a transducer 30 according to the presently preferred embodiment of the present invention. FIG. 3 depicts transducer 30 having an O-shaped pole 34, an I-shaped pole 36, and an inductive coil 66, fabricated atop a non-conductive substrate 32. O-shaped pole 34 is composed of a front portion 40 having arms 42 and 44 joined by a front leg 43 and a rear portion 46 having arms 48 and 50 joined by a back leg 49. Arms 42 and 44 of front i portion 40 are joined to arms 48 and 50 by respective vias 52 and 54. O-shaped pole 34 defines an interior, non-magnetic region 38. As will be more fully described below, region 38 has a low level of leakage flux from the arms of pole 34 and pole 36. I-shaped pole 36, placed almost entirely within region 38, is composed of respective front and rear portions 56 and 58 joined by via 62. Rear portion 58 is joined to back leg 49 of O-shaped pole 34 by via 60, and front portion 56 confronts front leg 43 of pole 34 to form a gap 64. Inductive coil 66 is composed of conductive sections 68, 70, 72 and 74, forming two convolutions although many more are preferred. Coil 66 interlaces poles 34 and 36 such that sections 68 and 70 lie under front portion 56 and over front portion 40, and sections 72 and 74 lie over rear portion 58 and under rear portion 46.

FIG. 4 is a cross section of transducer 30 taken along line 4—4 of FIG. 3. Together with FIG. 5, it shows the presently preferred method of constructing the preferred embodiment. FIG. 5 highlights a sequence of three metallic formations necessary to construct the invention. A first metallic formation of permalloy or other high-permeability material entails forming front portion 40 of pole 34 and rear portion 58 of pole 36 atop a NiFe plating base or seed layer 35, sputter deposited onto substrate 32. Before a second metallic formation, a gap layer 64 (visible in FIG. 4) and insulating layer 59 are applied over pole portions 40 and 58 and exposed areas of substrate 32. Gap layer 64 and insulating layer 59 are composed of aluminum oxide and cured photoresist, respectively; other suitable non-magnetic, non-conductive material may be used. Openings for vias 52, 54, 60, and 62 are formed in layers 59 and 64 at the ends of the arms of front portion 40 and at both ends of rear portion 58, respectively. A second metallic formation consisting of a thin, copper-over-chromium, seed layer 65 and overlying copper coil sections 68, 70, 72, and 74 is formed on insulating layer 59. These conductors are then covered by an insulating layer 69 (typically cured photoresist) to insulate them from each other as well as a third metallic formation. Openings corresponding to vias 52, 54, 60, and 62 are formed in insulating layer 69. The third metallic formation consisting of front portion 56 of 1-shaped pole 36 and rear portion 46 of O-shaped pole 34 is formed of permalloy atop a NiFe seed layer 55. Forming these pole portions fills the openings left in layers 59, 64 and 69 to complete vias 52, 54, 60, and 62, thereby joining front pole portions 40 and 56 to respective rear pole portions 46 and 58. Insulating layer 76 is then applied to protect the underlying transducer assembly.

From inspecting FIGS. 3, 4, and 5, those skilled in the art will appreciate that pole 34 forms a loop around a center region 38 in which I-shaped pole 36 is positioned. The relation of the poles is such that pole 34 divides and transports flux through arms 42 and 44 around and away from I-shaped pole 36 to minimize flux shunting, or leaking, between poles 34 and 36. Region 38, therefore, forms a region of very-low leakage-flux density.

Additionally, artisans will appreciate that the geometry of this pole assembly defines a magnetic circuit comprising first and second magnetic flux nodes, or junctions, at the from and back gaps, and first, second, and third magnetic branches. Each branch has first and second ends connected to respective first and second flux junctions. Thus, the branches may be seen as "magnetically parallel," like similarly-configured electric conductors. Hence, the junctions are flux distributions centers, or hubs. Accordingly, one junction, corresponding to via 60, distributes flux between the second and third branches, namely the arms of pole 34, and the first branch formed by I-shaped pole 36. The second flux junction, at front leg 43 and gap 64, distributes flux between the first branch and the second and third branches. Furthermore, artisans will appreciate that the essentially coplanar second and third branches transport flux around and away from the first branch, centered between the second and third. In doing so, the second and third branches reduce the likelihood of flux shunting from the second or third branches to the first and vice versa.

Another feature of the invention illustrated in FIGS. 3, 4 and 5 is that coil 66 and poles 34 and 36 are interlaced such that each convolution of the coil passes between the poles twice, permitting both the forward and return paths of the coil to generate magnetic flux (in the write mode), and/or to induce voltage (in the read mode). Thus, the embodiment of FIGS. 3, 4 and 5 implements a coil more efficient than previously known.

Figure 6:
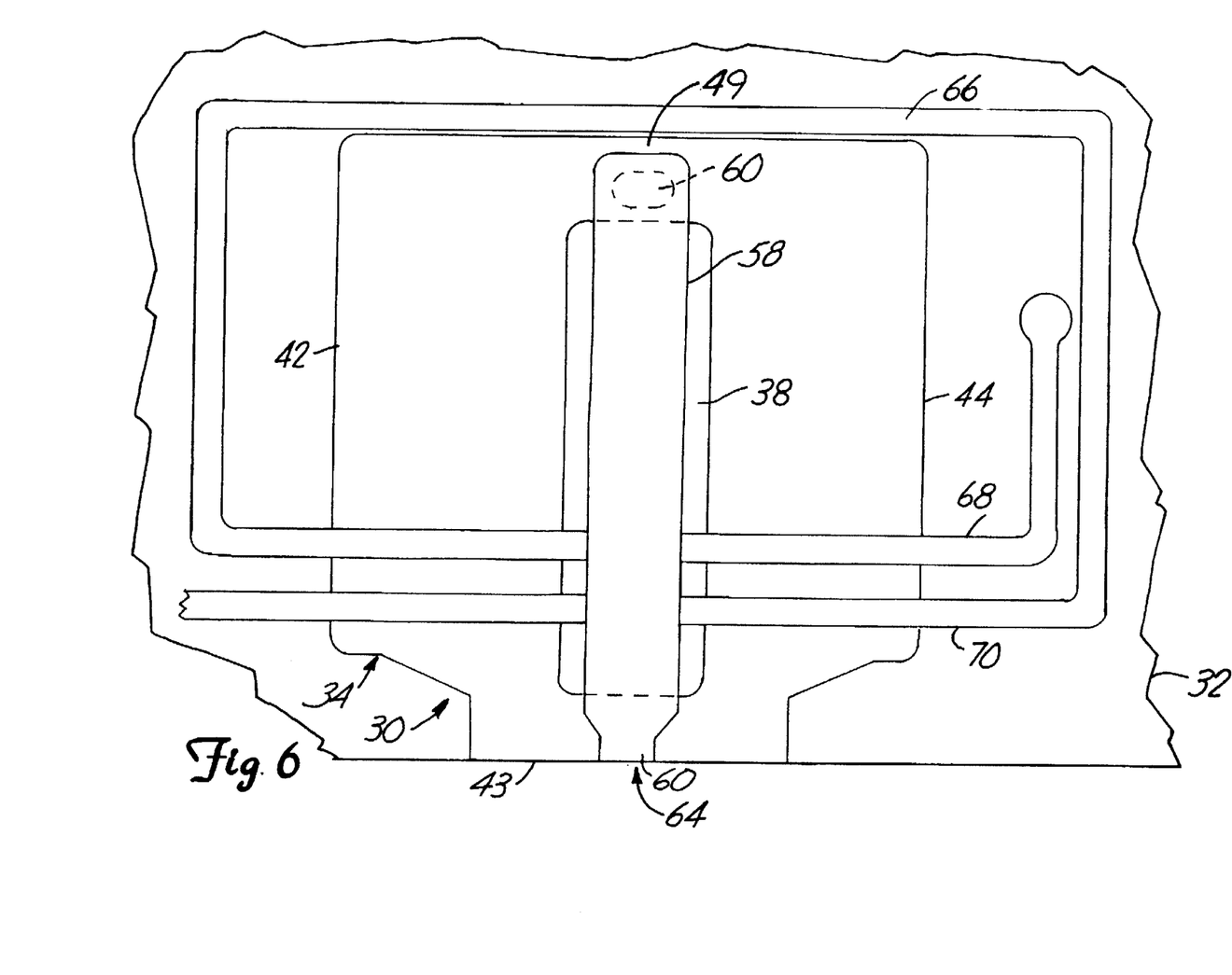
FIG. 6 is a top view of a transducer, with portions removed for clarity, according to another form of the present invention.

FIG. 6, using the same reference numerals for parts analogous to FIG. 3, illustrates a transducer 30 according to another form of the present invention. Although the embodiment of FIG. 6 divides the flux path to minimize flux shunting as in the embodiment of FIGS. 3–5, it employs a simpler coil having each convolution passing between the poles only once. Transducer 30 includes poles 34 and 36 and an inductive coil 66. Pole 34 is formed as a loop having a pair of substantially-parallel arms 42 and 44, a front connecting portion 43 and a back connecting portion 49. Pole 34 defines an interior region 38 of very-low leakage-flux density between the arms and the front and back portions of the pole. The entirety of pole 34 and region 38 are formed as a single thin-film layer on substrate 32 and then covered by a first insulating layer (not shown) composed of cured photoresist or other suitable non-conductive, non-magnetic material. Region 38 is thus filled by the first insulating layer. Coil 66, formed on the first insulating layer above pole 34, comprises a plurality of convolutions shown for simplicity as conductive sections 68 and 70. A portion of each convolution of coil 66 passes behind pole 34. A second insulating layer (not shown) of photoresist or other suitable non-conductive, non-magnetic material lies over coil 66 to insulate it from pole 36. The second insulating layer includes an opening above back portion 49 of pole 34 for magnetic via 60. I-shaped pole 36, composed of permalloy or other magnetic material, lies atop the second insulating layer, above region 38, front portion 43 of pole 34, and via 60. Forming pole 36 fills the openings for via 60, thereby joining the rear portions of the two poles. A front portion 56 of pole 36 confronts front portion 43 of pole 34 to form a transducing gap 64.

As in the preferred embodiment, the pole assembly of transducer 30 provides a magnetic circuit along the length of pole 36, across gap 64, along arms 42 and 44 of pole 34 and back to pole 58 through via 60 at the back portion of the transducer. Likewise, the geometry of the pole assembly reduces flux shunting between the poles by dividing flux between two arms that extend around and away from the I-shaped pole located between them. Artisans will also appreciate that, without the plane-changing vias 52, 54, and 62 in FIG. 3, the FIG. 6 embodiment provides a magnetic circuit with fewer discontinuities than the circuit of the embodiment of FIGS. 3–5. However, the FIG. 6 embodiment lacks the advantage of the increased inductive coupling found in FIGS. 3–5.

In each case, those skilled in the art will appreciate that the fabrication of the transducer is simple, comprising three metallic formations, yet results in a transducer that is effective and efficient in operation. Moreover, although the present invention has been described with reference to preferred embodiments, those skilled in the art will recognize that changes may be made in form and detail without departing from the spirit and scope of the invention.

What is claimed is:

1. A magnetic pole assembly for a transducer, comprising:

a first magnetic pole piece having first and second arms, each arm having front and back ends, the back ends of the first and second arms being joined to form a back region and the front ends of the first and second arms being joined to form a front region, the front region of the first pole piece defining a first surface, the first and second arms being spaced apart between the front and back regions to form a region of low leakage-flux density; and a second magnetic pole piece having a portion in the region of low leakage-flux density between the first and second arms, the second pole piece having front and back regions, the back region of the second pole piece being joined to the back region of the first pole piece and the front region defining a second surface, the second surface confronting the first surface to form a transducing gap region.

2. The assembly of claim 1 wherein the second pole piece, the gap region, and the first pole piece define a magnetic flux path, the magnetic flux path comprising the second pole piece, the gap region, and the first and second arms such that flux divides between the first and second arms of the first pole piece to minimize flux shunting between the first and second pole pieces.

3. The assembly of claim 1 wherein the first pole piece comprises a first thin-film layer and the second pole piece comprises a second thin-film layer, the first and second layers being spaced apart in substantially parallel planes.

4. The assembly of claim 1 wherein the second pole piece and the first and second arms of the first pole piece are positioned substantially parallel to each other.

5. The assembly of claim 1 further including an inductive coil comprising a conductor having a plurality of convolutions, each convolution having a portion lying between the first and second pole pieces in the region of low leakage-flux density.

6. The assembly of claim 5 wherein each convolution has first and second portions, the first portion magnetically linked to the front regions of the first and second pole pieces and the second portion magnetically linked to the back regions of the first and second pole pieces, so that the coil links twice with each pole piece.

7. The assembly of claim 1 comprising a first thin-film layer forming the front region of the first pole piece and the back region of the second pole piece and a second thin-film layer forming the back region of the first pole piece and the front region of the second pole piece, the first and second layers being spaced apart in substantially parallel planes, the front and back regions of the first pole piece being joined by respective first and second vias, and the front and back regions of the second pole piece being joined by a third via.

8. The assembly of claim 7 further comprising a third thin-film layer between and substantially parallel to the first and third layers, the third layer forming an inductive coil comprising a conductor having a plurality of convolutions, each convolution having first and second portions, each first portion being magnetically linked to the front regions of the first and second pole pieces and each second portion being magnetically linked to the back regions of the first and second pole pieces, the first and second portions linking each convolution twice with each pole piece.

9. A magnetic pole assembly for a transducer, comprising:

a first magnetic pole piece forming a closed loop around a region of low leakage-flux density, the first pole piece having back and front regions, the front region defining a first surface; and a second generally I-shaped magnetic pole piece generally disposed in the region of low leakage-flux density and having front and back regions, the front region defining a second surface confronting the first surface to form a transducing gap region and the back region of the first pole piece being joined to the back region of the second pole piece to form a first via.

10. The magnetic pole assembly of claim 9 wherein the first magnetic pole piece is generally O-shaped and generally circumscribes the I-shaped pole piece to define the region of low leakage-flux density.

11. The magnetic pole assembly of claim 9 wherein the first and second pole pieces are formed of respective first and second thin-film layers.

12. The magnetic pole assembly of claim 11 further including a thin-film inductive coil between the first and second thin-film layers.

13. The magnetic pole assembly of claim 9 wherein the front region of the first pole piece and the back region of the second pole piece are formed in a first thin-film layer, and the back region of the first pole piece and the front region of the second pole piece are formed in a second thin-film layer.

14. The magnetic pole assembly of claim 13 further comprising a thin-film inductive coil formed in a third thin-film layer between the first and second thin-film layers.

15. The magnetic pole assembly of claim 14 wherein the inductive coil has a plurality of convolutions each having first and second portions, the first portion magnetically linked to the front regions of the first and second pole pieces and the second portion magnetically linked to the back regions of the first and second pole pieces, so that the coil links twice with each pole piece.

16. The magnetic pole assembly of claim 15 wherein the first via is formed in the third thin-film layer to join the back regions of the first and second pole pieces and further including a second via in the third thin-film layer joining the front and back regions of the first pole piece and a third via in the third thin-film layer joining the front and back regions of the second pole piece.

17. A magnetic transducer having a magnetic circuit comprising first and second magnetic flux nodes and first, second, and third magnetically-parallel branches, each branch having first and second ends connected to respective first and second nodes, the first node distributing flux between the first branch and the second and third branches, the second node distributing flux between the second and third branches and the first branch, the second and third branches forming a closed loop circumscribing the first branch and defining a region of low leakage-flux density between the first branch and the second and third branches.

18. The magnetic transducer of claim 17 wherein the second and third branches are generally coplanar.

19. The magnetic transducer of claim 17 including a transducing gap in the first branch.

* * * * *

UNITED STATES PATENT AND TRADEMARK OFFICE
CERTIFICATE OF CORRECTION

PATENT NO. : 5,546,256

DATED : AUGUST 13, 1996

INVENTOR(S) : CHARLES H. TOLMAN

It is certified that error appears in the above-indentified patent and that said Letters Patent is hereby corrected as shown below:

Col. 1, line 55, delete "from", insert --front--

Col. 5, line 20, delete "from", insert --front--

Signed and Sealed this

Tenth Day of December, 1996

Attest:

BRUCE LEHMAN

Attesting Officer

Commissioner of Patents and Trademarks